United States Patent
Kim et al.

(10) Patent No.: US 11,572,287 B2
(45) Date of Patent: Feb. 7, 2023

(54) WATER-SOFTENING SYSTEM

(71) Applicant: KYUNGDONG NAVIEN CO., LTD., Pyeongtaek-si (KR)

(72) Inventors: Bum Seup Kim, Seoul (KR); Soo Young Lee, Seoul (KR); Ji Hyung Yoon, Seoul (KR); Gu Min Lim, Seoul (KR)

(73) Assignee: Kyungdong Navien Co., Ltd., Gyeonggi-do (KR)

( * ) Notice: Subject to any disclaimer, the term of this patent is extended or adjusted under 35 U.S.C. 154(b) by 124 days.

(21) Appl. No.: 16/803,391

(22) Filed: Feb. 27, 2020

(65) Prior Publication Data
US 2020/0283308 A1  Sep. 10, 2020

(30) Foreign Application Priority Data

Mar. 7, 2019 (KR) .................. 10-2019-0026110
Jan. 23, 2020 (KR) .................. 10-2020-0009529

(51) Int. Cl.
*C02F 1/00* (2006.01)
*C02F 1/44* (2006.01)
*C02F 5/00* (2006.01)

(52) U.S. Cl.
CPC .............. *C02F 1/001* (2013.01); *C02F 1/441* (2013.01); *C02F 5/00* (2013.01);
(Continued)

(58) Field of Classification Search
CPC .......... C02F 1/001; C02F 1/008; C02F 1/441; C02F 1/46109; C02F 1/4695;
(Continued)

(56) References Cited

U.S. PATENT DOCUMENTS 11,084,740 B2   8/2021  Lee et al.
2006/0231495 A1* 10/2006  Freydina ................. B01J 49/05
                                                    210/681
(Continued)

FOREIGN PATENT DOCUMENTS

KR   20080102589 A  * 11/2008  ............. B01D 35/06
KR   20140111091 A  *  9/2014  ............. C02F 1/469
KR   2015-0074245 A    7/2015

OTHER PUBLICATIONS

English Translation of KR20140111091A from EPO website. (Year: 2014).*

*Primary Examiner* — Terry K Cecil (57) ABSTRACT

A water-softening system includes a filter device including filter units that are provided in at least some of a plurality of supply channels arranged in parallel to supply raw water to a consumption site and that remove at least part of ionic matter contained in supplied raw water by electro-deionization and discharge soft water containing less ionic matter than the raw water, a plurality of supply valves provided in the plurality of supply channels to open or close the supply channels, and a processor connected to the filter device and the plurality of supply valves. The processor determines whether water is supplied to the consumption site and controls at least one of the plurality of supply valves to remain open to maintain a state in which water is allowed to be supplied to the consumption site, when it is determined that no water is supplied to the consumption site.

18 Claims, 5 Drawing Sheets

(52) U.S. Cl.
CPC .................. *C02F 2209/003* (2013.01); *C02F 2209/005* (2013.01); *C02F 2209/445* (2013.01)

(58) Field of Classification Search
CPC ............ C02F 2001/46119; C02F 2201/46145; C02F 2209/003; C02F 2209/005; C02F 2209/445; C02F 2307/14; C02F 5/00
See application file for complete search history.

(56) References Cited

U.S. PATENT DOCUMENTS

2013/0277222 A1\* 10/2013 Kwon .................. C02F 1/4691
204/663
2016/0355418 A1 12/2016 Lee et al.

\* cited by examiner

WATER-SOFTENING SYSTEM

CROSS-REFERENCE TO RELATED APPLICATION

This application claims the benefit of priority to Korean Patent Application Nos. 10-2019-0026110 and 10-2020-0009529, filed in the Korean Intellectual Property Office on Mar. 7, 2019 and Jan. 23, 2020, respectively, the entire contents of which are incorporated herein by reference.

TECHNICAL FIELD

The present disclosure relates to a water-softening system.

BACKGROUND

A water-softening system of a Point of Entry (PoE) type is a system that produces soft water from raw water and supplies the soft water to a consumption site. The consumption site may be a house. The soft water supplied to the consumption site is delivered to a faucet, a shower head, or the like for use.

When water is used in the consumption site, water is automatically supplied to the consumption site through the water-softening system by water pressure of raw water delivered from a water source to the consumption site. That is, the water-softening system cannot determine when to supply water to the consumption site.

The water-softening system needs to recognize when water is supplied to the consumption site. This is because when water is supplied to the consumption site, the water-softening system has to be controlled to produce soft water from raw water.

As foreign matter is accumulated or adsorbed in the water-softening system, a capability to produce soft water may be degraded, and impurities may be mixed with soft water. Accordingly, treatment is required to return the capability to produce soft water to the original state and remove impurities that are likely to be mixed with soft water.

Meanwhile, water may be used in the consumption site even while the treatment is performed. To sufficiently deliver water to the consumption site irrespective of the treatment, the water-softening system needs to consistently determine whether water is used in the consumption site and needs to supply water even while the treatment is performed.

SUMMARY

The present disclosure has been made to solve the above-mentioned problems occurring in the prior art while advantages achieved by the prior art are maintained intact.

An aspect of the present disclosure provides a water-softening system for always determining whether water is supplied to a consumption site. Another aspect of the present disclosure provides a water-softening system for performing predetermined treatment and during the treatment, determining whether water is used in a consumption site.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a water-softening system includes a filter device including filter units that are provided in at least some of a plurality of supply channels arranged in parallel to supply raw water to a consumption site and that remove at least part of ionic matter contained in supplied raw water by electro-deionization and discharge soft water containing less ionic matter than the raw water, a plurality of supply valves provided in the plurality of supply channels to open or close the supply channels, and a processor connected to the filter device and the plurality of supply valves. The processor determines whether water is supplied to the consumption site and controls at least one of the plurality of supply valves to remain open to maintain a state in which water is allowed to be supplied to the consumption site, when it is determined that no water is supplied to the consumption site.

According to another aspect of the present disclosure, a water-softening system includes filter units that are provided in supply channels for supplying raw water to a consumption site and that remove at least part of ionic matter contained in supplied raw water by electric force and discharge soft water containing less ionic matter than the raw water, filter valves provided in filter channels provided with the filter units among the supply channels, a treatment device that provides a treatment substance for predetermined treatment to the filter channels, and a processor connected to the filter units, the filter valves, and the treatment device. The processor controls the treatment device to provide the treatment substance to the filter channels, when a preset condition is satisfied and controls the filter valves to remain closed during treatment by the treatment substance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 1:
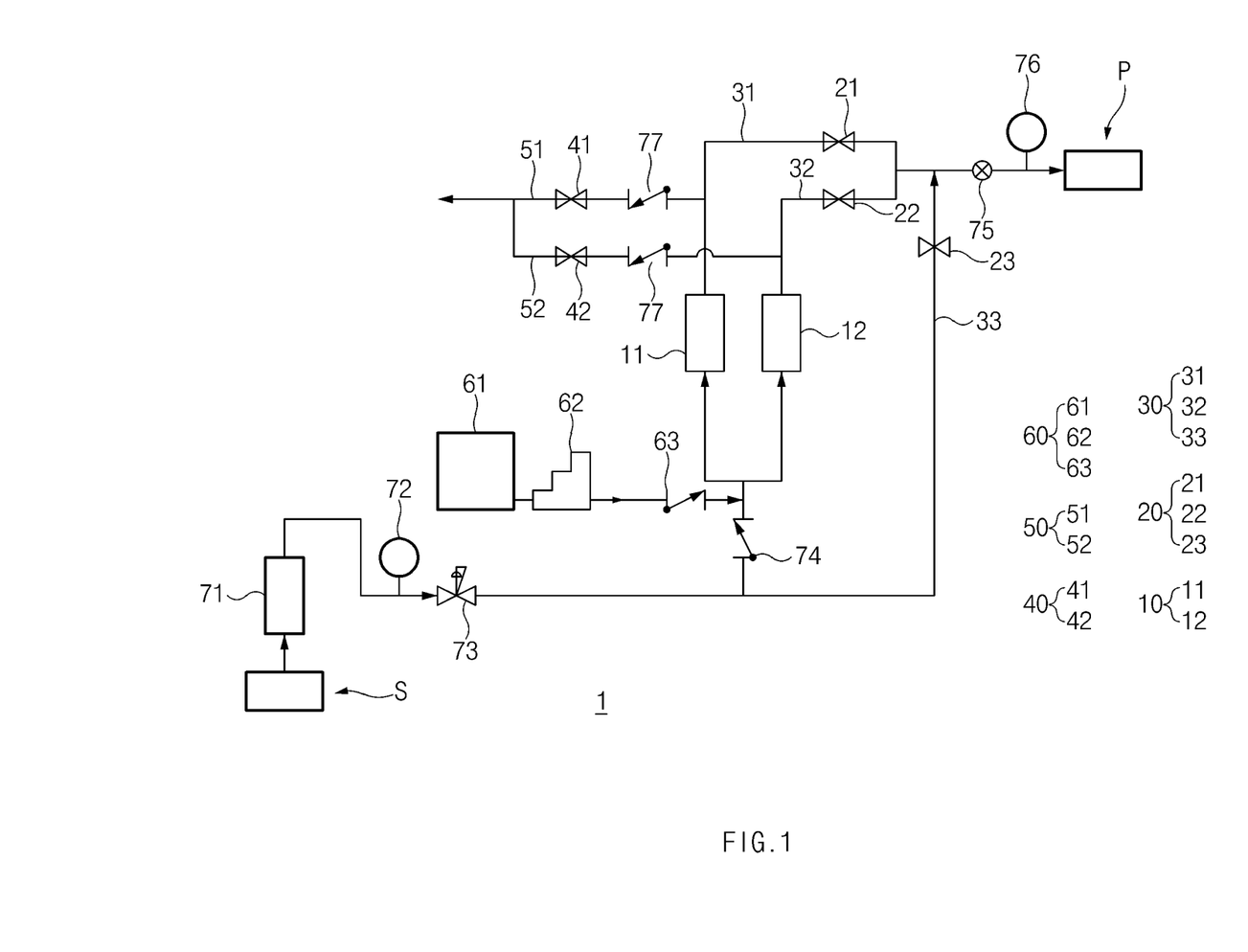
FIG. 1 is a schematic view of a water-softening system according to an embodiment of the present disclosure.

FIG. 1 is a schematic view of a water-softening system 1 according to an embodiment of the present disclosure.

Referring to FIG. 1, the water-softening system 1 according to an embodiment of the present disclosure may include a filter device, supply channels 30, supply valves 20, and a processor. The water-softening system 1 may further include drain channels 50, a treatment device 60, a flow-rate acquisition device 75, and other components.

Supply Channels 30

The supply channels 30 are channels for supplying raw water to a consumption site P. The supply channels 30 may be arranged in parallel. The supply channels 30 may include filter channels 31 and 32 and a raw water channel. Among the supply channels 30, the filter channels 31 and 32 refer to channels provided with filter units 10 of the filter device, and the raw water channel refers to a channel that is not provided with the filter units 10 such that the raw water is delivered to the consumption site P without change. Accordingly, some of the supply channels 30 may be the filter channels 31 and 32, and the rest may be the raw water channel. In an embodiment of the present disclosure, a total of three supply channels 30 are formed, and the first supply channel 31, the second supply channel 32, and the third supply channel 33 are arranged in parallel. Among the three supply channels 30, two supply channels are the filter channels 31 and 32, and the rest is the raw water channel. However, the configuration of the supply channels 30 is not limited thereto.

The supply channels 30 connect a water source S and the consumption site P. Here, the meaning of the term "connect" includes not only directly connecting the water source S and the consumption site P but also indirectly connecting the water source S and the consumption site P through other components. The supply channels 30 may be formed in a hollow tubular shape to deliver raw water from the water source S to the consumption site P.

The supply valves 20 are components disposed in the supply channels 30 to adjust opening/closing of the supply channels 30. As the valve-opening degrees of the supply valves 20 are adjusted, the supply valves 20 may open or close the supply channels 30. When the supply channels 30 are closed by the supply valves 20, water is not delivered to the consumption site P through the closed supply channels 30. When the supply channels 30 are opened by the supply valves 20, water is delivered to the consumption site P through the opened supply channels 30.

The processor may perform control such that at least one of the supply valves 20 remains open during operation of the water-softening system 1. Accordingly, even while the filter channels 31 and 32 are treated or any one of the filter units 10 performs a regeneration mode, at least one supply channel 30 may remain connected to the consumption site P to deliver water, and whether water is supplied to the consumption site P may always be determined. When water is supplied to the consumption site P regardless of a situation inside the water-softening system 1, water may be supplied through the opened supply channel 30, and through the occurrence of the water flow, it can be identified that water is supplied to the consumption site P due to the use of water by a user. In contrast, when no water is supplied to the consumption site P, a water flow does not occur even through at least one supply channel 30 is open. Therefore, it can be identified that no water is supplied to the consumption site P because the user does not use water.

The supply valves 20 may be solenoid valves that remain open or closed in a default state in which electric power is not supplied and that are closed or opened only in an activated state in which electric power is supplied. However, the supply valves 20 may not be limited thereto.

The filter channels 31 and 32 are the supply channels 30 provided with the filter units 10 and may include the first supply channel 31 and the second supply channel 32 as illustrated. The filter units 10 may be disposed in the filter channels 31 and 32. Accordingly, the filter unit 10 disposed in the first supply channel 31 may be a first filter unit 11, and the filter unit 10 disposed in the second supply channel 32 may be a second filter unit 12. Detailed contents regarding the filter units 10 will be given in the description of the filter device.

The supply valves disposed in the filter channels 31 and 32 may be referred to as filter valves 21 and 22. Accordingly, the filter valves 21 and 22 may include the first supply valve 21 disposed in the first supply channel 31 provided with the first filter unit 11 and the second supply valve 22 disposed in the second supply channel 32 provided with the second filter unit 12.

Downstream of the filter units 10, the filter valves 21 and 22 may be installed in the filter channels 31 and 32.

The raw water channel is the supply channel 30 connected to the consumption site P so as to be distinguished from the filter channels 31 and 32 to form a state in which water is allowed to be supplied to the consumption site P even while the filter valves 21 and 22 are closed for treatment by a treatment substance that will be described below. Accordingly, the raw water channel may include the third supply channel 33 that is not provided with the filter units 10 as illustrated.

The raw water channel may include a raw water valve that is a corresponding valve. The third supply channel 33 may include a third supply valve 23 provided therein, and the third supply valve 23 may be a raw water valve.

However, according to a modified example of the embodiment of the present disclosure, the third supply channel 33 may not be present, and the supply channels 30 may include only the first supply channel 31 and the second supply channel 32. Accordingly, the third supply valve 23 may not be present.

The first supply valve 21 may be a solenoid valve that remains open in the default state, in which no electrical signal is received, and that is closed only when receiving an electrical signal. The second supply valve 22 and the third supply valve 23, which are the remaining supply valves 20 other than the first supply valve 21, may be solenoid valves that remain closed in a default state and that are opened only when receiving an electrical signal. However, the types of the valves and the states of the valves in the default state are not limited thereto.

Even though the consumption site P requires water supply while all the supply valves 20 are closed, the water-softening system 1 cannot recognize such a request. The water-softening system 1 may recognize that the consumption site P requires water supply and may try to deliver water stored in the water-softening system 1 to the consumption site P. However, because all the supply valves 20 are closed, very high pressure may be required to forcibly feed water.

If at least one supply valve 20 is open, when the consumption site P requires water supply, water flows through the water-softening system 1 by pressure at which raw water is supplied from the water source S. The flow-rate acquisition device 75, which will be described below, may be used to determine whether water flows in the water-softening system 1. Accordingly, whether the consumption site P requires water supply may be determined based on whether water flows in the water-softening system 1. When the supply of water to the consumption site P is required, the filter units 10 may be appropriately operated to supply soft water to the consumption site P. The first supply valve 21 may remain open in the default state, in which no electrical signal is received, to allow the water-softening system 1 to perform the above-described operation. The first supply valve 21 may be referred to as a reference valve.

A connecting channel that connects the water source S and the filter channels 31 and 32 to supply raw water to the filter channels 31 and 32 among the supply channels 30 may be additionally disposed, and a connecting check valve 74 that allows water to flow only in one direction may be disposed in the connecting channel. The connecting check valve 74 may be disposed to interrupt a reverse flow of water from the filter channels 31 and 32 to the water source S without interrupting the supply of raw water to the filter channels 31 and 32. A solenoid valve may be used as the connecting check valve 74. Furthermore, the connecting check valve 74 may always remain open to allow raw water to be supplied to the filter channels 31 and 32 and may be closed only when receiving an electrical signal.

Filter Device

The filter device is a component that removes ionic matter in raw water and generates soft water. The filter device includes the filter units 10. The filter units 10 are components that are provided in the filter channels 31 and 32, which are at least some supply channels, and that remove at least part of ionic matter contained in supplied raw water by electric force and release soft water containing less ionic matter than the raw water.

The filter units 10 may remove the ionic matter by electro-deionization. More specifically, there is an electro-deionization method among methods of removing ionic matter. When DC voltage is applied to charged particles in an electrolyte, positively charged particles move to a negative electrode, and negatively charged particles move to a positive electrode. This is called electrophoresis. The electro-deionization method refers to a method of selectively adsorbing or moving and removing an ion (ionic matter) in water through electrodes or an ion exchange membrane, based on the principle of electric force (electrophoresis).

The electro-deionization method includes Electrodialysis (ED), Electro Deionization (EDI), Continuous Electro Deionization (CEDI), Capacitive Deionization (CDI), and the like. A filter unit of an ED type includes electrodes and an ion exchange membrane. Further, a filter unit of an EDI type includes electrodes, an ion exchange membrane, and an ion exchange resin. In contrast, a filter unit of a CDI type does not include both an ion exchange membrane and an ion exchange resin, or does not include an ion exchange resin.

The filter units 10 according to an embodiment of the present disclosure may remove ionic matter using the Capacitive Deionization (CDI) among the electro-deionization methods. The CDI refers to a method of removing an ion using the principle by which an ion (or ionic matter) is adsorbed on or desorbed from the surface of an electrode by electric force.

Figure 2:
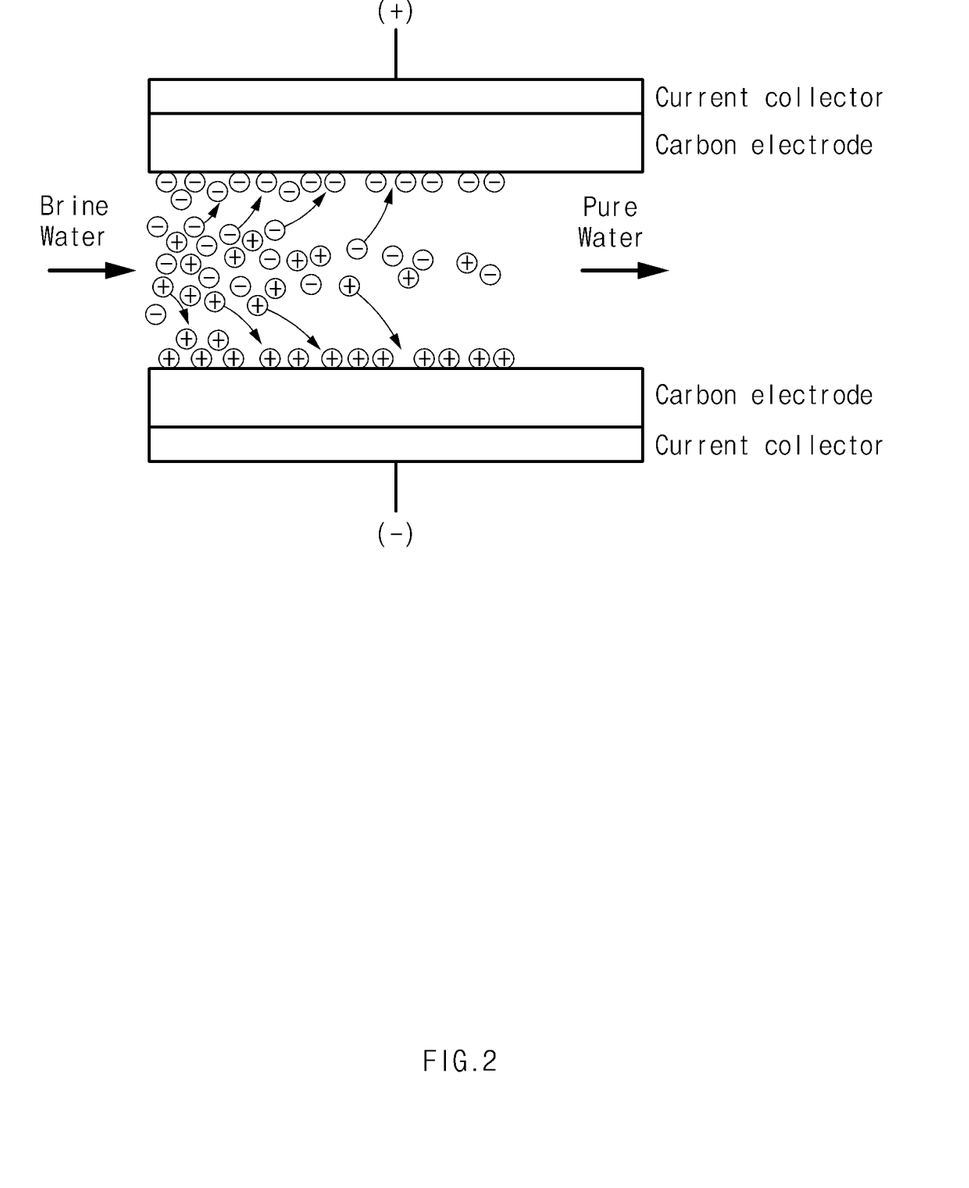
FIG. 2 is a schematic view illustrating the principle by which ionic matter is removed in a CDI method.
Figure 3:
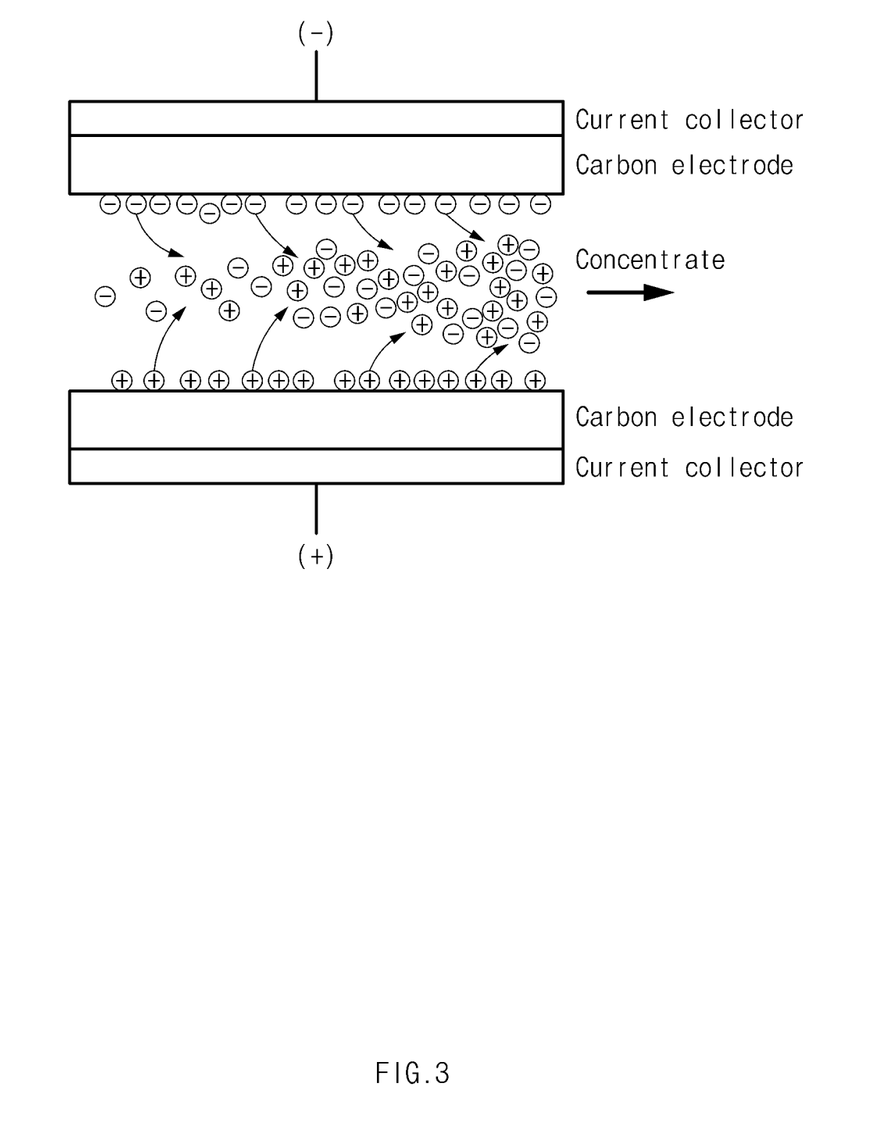
FIG. 3 is a schematic view illustrating the principle by which electrodes are regenerated in the CDI method.

FIG. 2 is a schematic view illustrating the principle by which ionic matter is removed in the CDI method. FIG. 3 is a schematic view illustrating the principle by which electrodes are regenerated in the CDI method.

A removal mode and a regeneration mode in the CDI method will be described below with reference to FIGS. 2 and 3. As illustrated in FIG. 2, when water containing ions passes between electrodes in a state in which voltage is applied to the electrodes, negative ions move to the positive electrode, and positive ions move to the negative electrode. That is, adsorption occurs. The ions may be removed from the water by the adsorption. The mode in which the filter unit 10 removes, through the electrodes, the ions (ionic matter) in the water passing through the filter unit 10 is referred to as the removal mode.

However, the adsorption capacity of the electrodes is limited. Accordingly, as the adsorption continues, the electrodes can no longer adsorb ions. To prevent this, the electrodes need to be regenerated by removing the ions adsorbed on the electrodes. To this end, as illustrated in FIG. 3, voltage opposite to that in the removal mode may be applied to the electrodes, or no voltage may be applied to the electrodes. The mode in which the filter unit 10 regenerates the electrodes is referred to as the regeneration mode. The regeneration mode may be performed before or after the removal mode.

Accordingly, for this operation, the filter unit 10 may include electrodes. The filter unit 10 may selectively perform the removal mode of removing ionic matter by electro-deionization through the electrodes, or the regeneration mode of regenerating the electrodes. Accordingly, when raw water is supplied to the filter unit 10, the filter unit 10 may generate and release soft water by removing at least part of ionic matter in the raw water in the removal mode, and the filter unit 10 may release water with an increased ion content by providing ionic matter adsorbed on the electrodes to the raw water in the regeneration mode.

The filter device may include at least two filter units 10 such that at least two supply channels 30 among the plurality of supply channels 30 are provided with the filter units 10, respectively. Accordingly, one of the at least two filter units 10 may be the first filter unit 11 and may be disposed in the first supply channel 31, and another one of the at least two filter units 10 may be the second filter unit 12 and may be disposed in the second supply channel 32.

Drain Channels 50

The drain channels 50 are components that are connected to the filter channels 31 and 32 among the supply channels 30 and that drain water in the filter channels 31 and 32 to the outside. Accordingly, likewise to the supply channels 30, the drain channels 50 may be foiled in a hollow tubular shape such that fluid is capable of flowing through the drain channels 50.

The drain channels 50 may be connected to the filter channels 31 and 32, respectively. Accordingly, in an embodiment of the present disclosure, the drain channels 50 may include a first drain channel 51 and a second drain channel 52 because the filter channels 31 and 32 include the first supply channel 31 and the second supply channel 32. The first drain channel 51 may be connected to the first supply channel 31, and the second drain channel 52 may be connected to the second supply channel 32.

The drain channels 50 may be disposed downstream of the filter units 10 with respect to the flow direction of raw water. Accordingly, the raw water provided along the existing flow direction of the raw water may pass through the filter units 10 and may be discharged to the drain channels 50. However, the drain channels 50 may be disposed upstream of the filter units 10 with respect to the flow direction of the raw water.

Specifically, the drain channels 50 are connected to the filter channels 31 and 32, which are the supply channels 30 provided with the filter units 10, and discharge water that is released from the filter units 10 and that contains a larger amount of ionic matter than the raw water, when the filter units 10 are in the regeneration mode.

However, the water is not always discharged, and the discharge may be adjusted. Accordingly, drain valves 40 may be provided in the drain channels 50 to open or close the drain channels 50. In an embodiment of the present disclosure, because the drain channels 50 include the first drain channel 51 and the second drain channel 52, a first drain valve 41 may be disposed in the first drain channel 51, and a second drain valve 42 may be disposed in the second drain channel 52.

Drain check valves 77, which are check valves, may be disposed upstream of the drain valves 40 with respect to the flow direction of water. The drain check valves 77 may be check valves that allow water to be discharged from the filter channels 31 and 32 through the drain channels 50, but interrupt a reverse flow of water from the outside to the filter channels 31 and 32.

Treatment Device 60

The treatment device 60 is a component that provides a treatment substance for predetermined treatment to the filter channels 31 and 32. The treatment device 60 may include a pump 62 and a tank 61. The tank 61 is a component that stores the treatment substance used for treatment such as sterilization, cleaning, or the like, and the pump 62 is a component that forcibly feeds the treatment substance stored in the tank 61 to the filter channels 31 and 32. The treatment substance may be, but is not limited to, a citric acid, and may further include another sterilizing substance.

As illustrated, the treatment device 60 may be disposed upstream of the filter device with respect to the flow direction of water so as to be connected to the filter channels 31 and 32. However, the treatment device 60 may be disposed downstream of the filter device. Upstream of the filter units 10, the treatment device 60 may provide the treatment substance to the filter channels 31 and 32. However, the treatment device 60 may be disposed downstream of the filter units 10 as long as the treatment device 60 is capable of providing the treatment substance to stagnant water in the filter channels 31 and 32.

The treatment device 60 may be directly connected to the filter channels 31 and 32, but may be indirectly connected to the filter channels 31 and 32 through other channels. Furthermore, the treatment device 60 may further include a treatment check valve 63 to prevent water from flowing backward to the tank 61 or the pump 62. The treatment check valve 63 may be a check valve that allows water or the treatment substance to be released from the tank 61 and the pump 62 to the filter channels 31 and 32, but interrupts a reverse flow of the water or the treatment substance from the filter channels 31 and 32 to the tank 61 or the pump 62.

Flow-Rate Acquisition Device 75

The flow-rate acquisition device 75 is a component that obtains the flow rate of water delivered to the consumption site P. As the flow rate is obtained, the processor may determine whether water is delivered to the consumption site P. When the flow rate obtained by the flow-rate acquisition device 75 is higher than or equal to a critical flow rate, the processor, which will be described below, may determine that water is supplied to the consumption site P. In an embodiment of the present disclosure, the critical flow rate may be, but is not limited to, 1.5 LPM. The flow-rate acquisition device 75 may obtain the flow rate of water delivered to the consumption site P, by using the Kalman vortex method, a method using the Doppler Effect, or the like. However, the method of obtaining the flow rate is not limited thereto.

In FIG. 1, the flow-rate acquisition device 75 is illustrated as disposed downstream of the supply channels 30 with respect to the flow direction of raw water. However, the flow-rate acquisition device 75 may be disposed upstream of the supply channels 30.

The flow-rate acquisition device 75 is connected with the processor and transfers the obtained flow rate to the processor. The processor may adjust opening/closing of the valves depending on the received flow rate.

Other Components

The water-softening system 1 according to an embodiment of the present disclosure may further include TDS sensors 72 and 76. The TDS sensors 72 and 76 are components that measure total dissolved solid (TDS) contained in water. The TDS sensors 72 and 76 may be disposed upstream and downstream of the supply channels 30 with respect to the flow direction of water. The TDS sensor 72 and 76 may transfer the obtained TDSs to the processor, and the transferred TDSs may be used for various operations and control.

That is, the processor may control opening/closing of the valves in the water-softening system 1 or operation of the filter units 10, based on at least one of the TDSs transferred from the upstream TDS sensor 72 and the downstream TDS sensor 76. For example, when the TDS measured by the upstream TDS sensor 72 is high, the processor may perform control such that the filter units 10 receive higher voltage and remove a larger amount of ionic matter in the removal mode, or may perform control to reduce mode transition time during which the mode performed by the filter units 10 is switched. However, the control of the processor is not limited thereto.

Furthermore, the TDSs obtained by the TDS sensors 72 and 76 may be transferred to the processor, and the processor may be connected to a display device (not illustrated) to display the obtained TDSs. As the obtained TDSs are displayed, a user may identify the quality of water flowing in the water-softening system 1 as needed.

The water-softening system 1 according to an embodiment of the present disclosure may further include a regulator 73. The regulator 73 may be disposed upstream of the supply channels 30 with respect to the flow direction of water. Accordingly, the flow rate of raw water delivered to the supply channels 30 may be maintained within a predetermined range. Furthermore, a pre-filter 71 may be disposed on the most upstream side. The pre-filter 71 may firstly filter various types of foreign substances and may deliver filtered water to the supply channels 30.

Processor (not Illustrated)

The processor is a component that includes an element capable of a logic operation of performing a control command. The processor may include a central processing unit (CPU). The processor may be connected to components such as the filter device, the supply valves 20, and the like and may transfer signals depending on control commands to the components. The processor may be connected to various sensors or acquisition devices and may receive obtained information in a signal form. Accordingly, in an embodiment of the present disclosure, the processor may be connected to the filter device, the treatment device 60, and the supply valves 20.

Furthermore, the processor may be additionally connected to the drain valves 40, the flow-rate acquisition device 75, the regulator 73, and the TDS sensors 72 and 76. The processor may be electrically connected with the components. The processor may be wiredly connected to the components, or may additionally have a communication module capable of wireless communication to communicate with the components.

Control commands that the processor performs may be stored and utilized on a storage medium, and the storage medium may be, but is not limited to, a device such as a hard disk drive (HDD), a solid state drive (SSD), a server, a volatile medium, a nonvolatile medium, or the like. In addition, data required for the processor to perform tasks may be additionally stored in the storage medium.

A method by which the processor controls the water-softening system 1 will be described below with reference to FIGS. 4 and 5.

Figure 4:
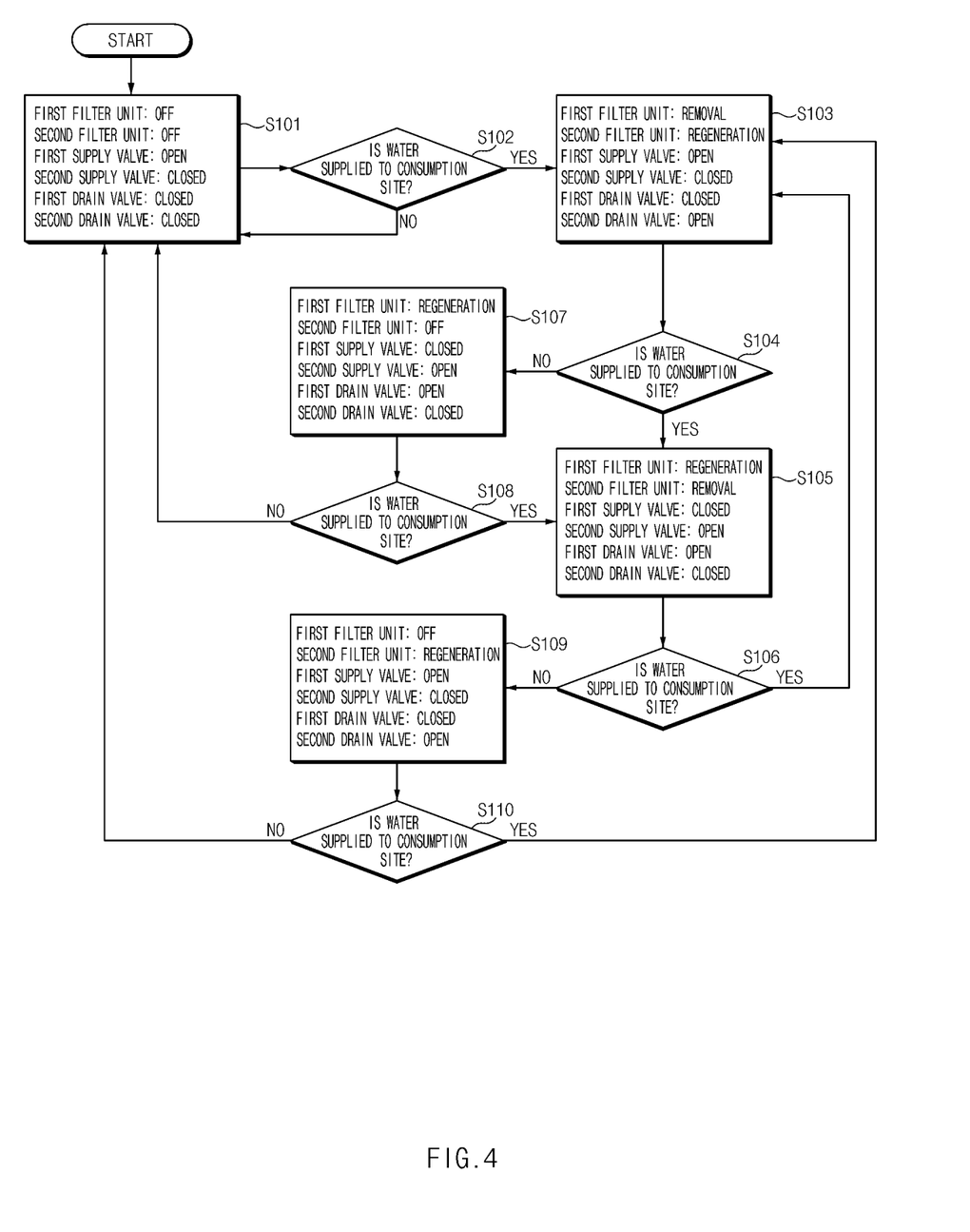
FIG. 4 is a flowchart illustrating a process of supplying water by controlling filter units arranged in parallel in the water-softening system according to an embodiment of the present disclosure.

FIG. 4 is a flowchart illustrating a process of supplying water by controlling the filter units 10 arranged in parallel in the water-softening system 1 according to an embodiment of the present disclosure.

A method of supplying water to the consumption site P by controlling the filter units 10 in the water-softening system 1 will be described below with additional reference to FIG. 4. The third supply valve 23, which is the raw water valve, may remain closed because predetermined treatment is not performed on the filter units 10. The third supply valve 23, which is the raw water valve, may not be included in the water-softening system 1 as described above when water is supplied to the consumption site P by controlling the filter units 10. Furthermore, the third supply channel 33 may also not be included in the water-softening system 1.

To maintain a state in which water is allowed to be supplied to the consumption site P, the processor may perform control such that at least one of the supply valves 20 remains open in a state in which the water-softening system 1 is installed. Because the at least one supply valve 20 is open, water may always be delivered to the consumption site P not only in a state in which it is determined that water continues to be supplied to the consumption site P but also in a state in which it is determined that no water is supplied to the consumption site P. A user may operate a faucet to request water to be supplied to the consumption site P, and water may be supplied to the consumption site P through the supply channel 30 in which the open supply valve 20 is disposed.

In an embodiment of the present disclosure, in the default state, as described above, the first supply vale 21 may be opened, and the remaining valves may be closed. Accordingly, when water supply is requested by the consumption site P, water may be supplied to the consumption site P through the first supply channel 31. The default state may be referred to as a standby state (S101). In the standby state, the filter units 10 may not be operated.

In a modified example of the embodiment of the present disclosure, in the default state, the first supply valve 21 and the second supply valve 22 may be opened. Accordingly, when water supply is requested by the consumption site P, water may be supplied to the consumption site P through the first supply channel 31 and the second supply channel 32. The modified example may include the modified standby state described above. In the modified standby state, both the first supply valve 21 and the second supply valve 22 may be opened, and it may be recognized that water is used in the consumption site P even when any one supply valve fails. Accordingly, the reliability of the water-softening system 1 of the present disclosure may be improved. In the modified standby state, the filter units 10 may not be operated.

In the standby state (S101), the processor determines whether water is supplied to the consumption site P (S102). A flow rate that the flow-rate acquisition device 75 transfers to the processor may be used to determine whether water is supplied to the consumption site P.

When it is determined that no water is supplied to the consumption site P, the processor performs control such that at least one of the plurality of supply valves 20 remains open to maintain a state in which water is allowed to be supplied to the consumption site P. Here, the at least one supply valve 20 may be the first supply valve 21. That is, the processor may return to the standby state. Furthermore, according to the modified example of the embodiment of the present disclosure, the processor may return to the modified standby state when it is determined that no water is supplied to the consumption site P.

The processor may determine that water is supplied to the consumption site P. That is, the processor may determine that water starts to be supplied to the consumption site P through the supply channel 30 in which the supply valve 20 in the open state is installed. At this time, in the standby state or the modified standby state, the processor may perform control such that one of the first and second filter units 11 and 12 performs the removal mode and the other performs the regeneration mode, and the processor may perform control to open the supply valve 20 installed in the supply channel 30 provided with the filter unit 10 that performs the removal mode and may perform control to close the supply valve 20 installed in the supply channel 30 provided with the filter unit 10 that performs the regeneration mode. At this time, the filter unit 10 that performs the removal mode may be the filter unit 10 installed in the supply channel 30 in which the supply valve 20 in the open state is installed. When it is determined that water is supplied to the consumption site P in the modified standby state, one of the first supply valve 21 and the second supply valve 22 that are open may be closed, and only the filter unit 10 corresponding to the other may be controlled to perform the removal mode. One example of the state in which the control is performed on the basis that water is supplied to the consumption site P in the standby state or the modified standby state is described as S103 in FIG. 4.

At this time, the processor may perform control such that the drain valves 40 are changed to opposite states to the open/closed states of the corresponding supply valves 20 in conjunction with the open/closed states of the corresponding supply valves 20. Here, the supply valves 20 corresponding to the respective drain valves 40 refer to the supply valves 20 disposed in the supply channels 30 to which the predetermined drain valves 40 are connected.

Description will be given based on the standby state (S101) according to an embodiment of the present disclosure. In a state in which the first supply valve 21 is open, water starts to be supplied to the consumption site P through the first supply channel 31 in which the first supply valve 21 is installed. At this time, the processor may operate the filter device and may control open/closed states of the valves. In the state in which the first supply valve 21 is open, the processor may perform control such that the first filter unit 11 performs the removal mode and the second filter unit 12 performs the regeneration mode (S103). When water starts to be supplied in the modified standby state, control to close the second supply valve 22 may be additionally performed in addition to the above-described control.

Furthermore, the processor may perform control such that the first supply valve 21 remains open and the second supply valve 22 remains closed. Correspondingly, the processor may perform control such that the first drain valve 41 is closed and the second drain valve 42 is opened.

Whenever mode transition time, which is predetermined time, elapses after water starts to be supplied to the consumption site P, the processor may determine again whether water is supplied to the consumption site P. The mode transition time may be, but is not limited to, 90 seconds. When it is determined again that water is supplied to the consumption site P, the processor may perform control such that the first filter unit 11 performs the removal mode or the regeneration mode that is not currently performed by the first filter unit 11 and the second filter unit 12 performs the removal mode or the regeneration mode that is not currently performed by the second filter unit 12. Furthermore, the processor may perform control to open the first or second supply valve 21 or 22 installed in the supply channel 30 provided with the filter unit 10 that is to perform the removal mode and may perform control to close the first or second supply valve 21 or 22 installed in the supply channel 30 provided with the filter unit 10 that is to perform the regeneration mode.

Description will be given based on the situation (S104) in which the mode transition time elapses and whether water is supplied to the consumption site P is determined again after the situation (S103) in which the control is performed on the basis that water is supplied to the consumption site P for the first time. When it is determined again that water is supplied to the consumption site P (S105), in contrast to S103, the processor may perform control such that the first filter unit 11 performs the regeneration mode and the second filter unit 12 performs the removal mode. Furthermore, in contrast to S103, the processor may perform control such that the first supply valve 21 is closed and the second supply valve 22 is opened. The drain valves 40 may be controlled to be changed to opposite states to the states of the corresponding supply valves 20. Therefore, in contrast to S103, the processor may perform control such that the first drain valve 41 is opened and the second drain valve 42 is closed.

Thereafter, whether water is supplied to the consumption site P may be determined again after the mode transition time elapses (S106). When it is determined that water is still supplied to the consumption site P, the processor may return to the previous state (S103). Accordingly, the processor may carry out control such as a cycle in which, while water continues to be supplied to the consumption site P, the modes of the filter units 10 are alternately changed and the open/closed states of the supply valves 20 and the drain valves 40 are changed depending on the states of the filter units 10. That is, the water-softening system 1 according to an embodiment of the present disclosure may continue to supply soft water to the consumption site P without a stop while reciprocating between S103 and S105 with a period corresponding to twice the mode transition time.

It has been described that whenever the mode transition time elapses after water starts to be supplied to the consumption site P, the processor determines again whether water is supplied to the consumption site P. When it is determined that no water is supplied to the consumption site P (S107 and S109), the processor may perform control such that the first or second filter unit 11 or 12 performing the removal mode performs the regeneration mode and the first or second filter unit 11 or 12 performing the regeneration mode stops operating. Furthermore, the processor may perform control to open the first or second supply valve 21 or 22 installed in the supply channel 30 provided with the filter unit 10 that is to stop operating and may perform control to close the first or second supply valve 21 or 22 installed in the supply channel 30 provided with the filter unit 10 that is to perform the regeneration mode.

Description will be given based on the situation (S104) in which the mode transition time elapses and whether water is supplied to the consumption site P is determined again after the situation (S103) in which the control is performed on the basis that water is supplied to the consumption site P for the first time. When it is determined that no water is supplied to the consumption site P (S107), in contrast to S103, the processor may perform control such that the first filter unit 11 performs the regeneration mode and the second filter unit 12 stops operating. In contrast to S103, the processor may perform control such that the first supply valve 21 is closed and the second supply valve 22 is opened. In contrast to S103, the processor may perform control such that the first drain valve 41 is opened and the second drain valve 42 is closed.

Description will be given based on the situation (S106) in which the mode transition time elapses and whether water is supplied to the consumption site P is determined again after the situation (S105) in which the control is performed on the basis that water is supplied to the consumption site P. When it is determined that no water is supplied to the consumption site P (S109), in contrast to S105, the processor may perform control such that the first filter unit 11 stops operating and the second filter unit 12 performs the regeneration mode. In contrast to S105, the processor may perform control such that the first supply valve 21 is opened and the second supply valve 22 is closed. In contrast to S105, the processor may perform control such that the first drain valve 41 is closed and the second drain valve 42 is opened.

In the situation in which the control is performed such that the supply of water to the consumption site P is stopped, the filter unit 10 used until now regenerates electrodes while performing the regeneration mode, and the filter unit 10 disposed in the supply channel 30 connected with the consumption site P in the open state may stop operating and may maintain the state of always supplying water to the consumption site P.

Until confirmation time, which is predetermined time, elapses after it is determined that the supply of water to the consumption site P is stopped, the processor may determine again whether water is supplied to the consumption site P (S108 and S109). The confirmation time may be, but is not limited to, 90 seconds. When it is determined that no water is supplied to the consumption site P (S101), the processor may perform control such that the first and second filter units 11 and 12 stop operating, a predetermined one of the first and second supply valves 21 and 22 is opened, and the other is closed. Furthermore, the processor may perform control such that the drain valves 40 are closed. According to an embodiment of the present disclosure, when it is determined that water is not still supplied to the consumption site P even after the confirmation time elapses (S108 and S110), the processor may perform control such that the filter units 10 and the valves return to the standby state (S101).

Until the confirmation time elapses after it is determined that the supply of water to the consumption site P is stopped, the processor may determine again whether water is supplied to the consumption site P, at a predetermined time interval (S108 and S110) and may determine that water is supplied to the consumption site P (S103 and S105). In this case, the processor may perform control such that the first or second filter unit 11 and 12 that stops operating performs the removal mode while the open/closed states of the first and second supply valves 21 and 22 are maintained. Here, the predetermined time interval at which whether water is supplied or not is determined may be, but is not limited to, 1 second, 5 seconds, 10 seconds, 15 seconds, or the like that is obtained by dividing 90 seconds by a natural number.

Referring to the situation (S105) in which it is determined in S108 that water is supplied to the consumption site P, it can be seen that the control of the first filter unit 11 performing the regeneration mode and the control of the valves are the same as those in S107, but only the second filter unit 12 that stops operating is controlled by the processor to perform the removal mode.

Referring to the situation (S103) in which it is determined in S110 that water is supplied to the consumption site P, it can be seen that the control of the second filter unit 12 performing the regeneration mode and the control of the valves are the same as those in S109, but only the first filter unit 11 that stops operating is controlled by the processor to perform the removal mode.

As described above, even though the supply of water to the consumption site P is temporarily stopped, when the supply of water to the consumption site P restarts within the confirmation time, soft water may be supplied to the consumption site P again by minimum control, and a cycle may be resumed to supply soft water to the consumption site P.

Figure 5:
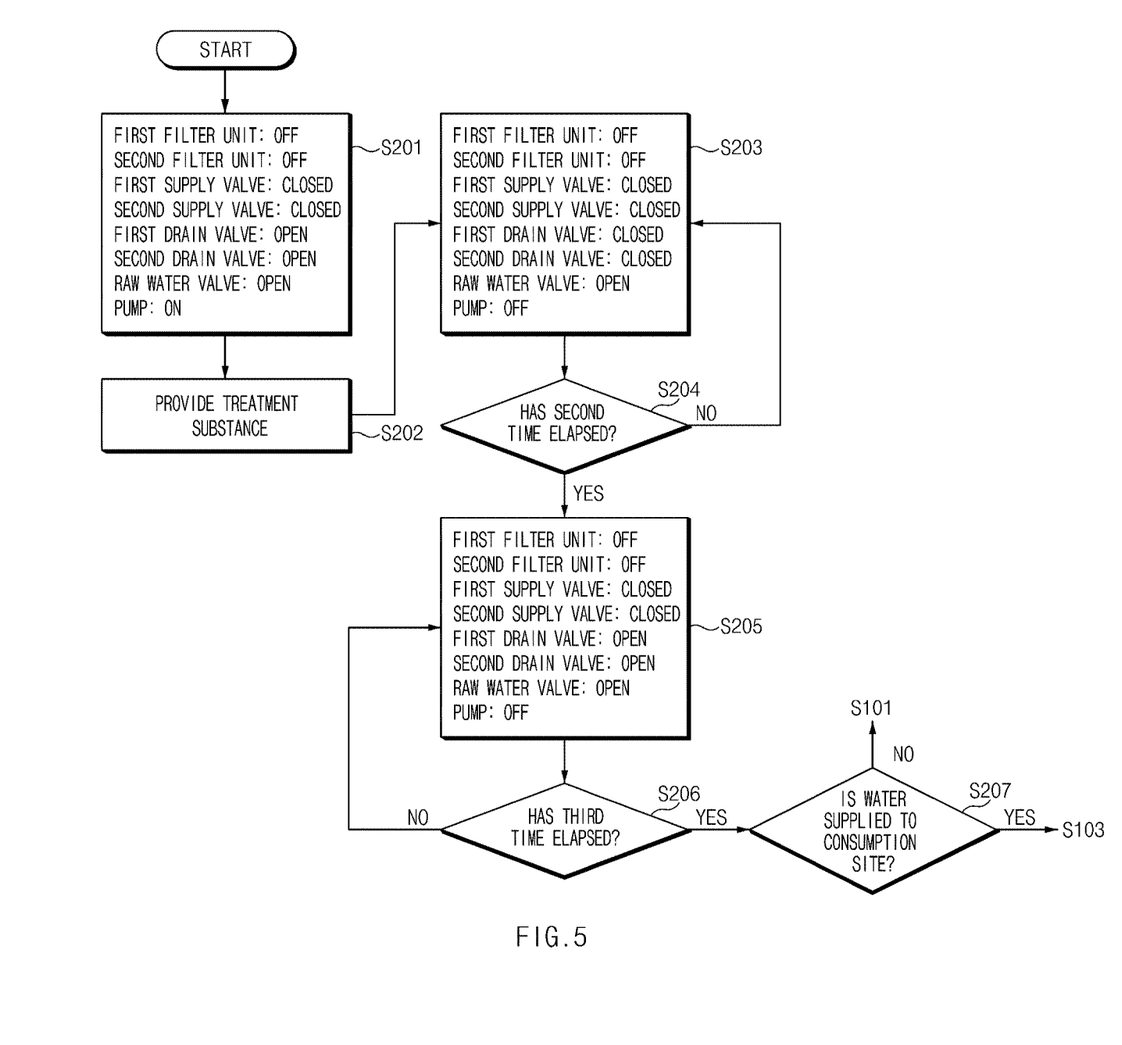
FIG. 5 is a flowchart illustrating a process of performing predetermined treatment on filter channels using the water-softening system according to an embodiment of the present disclosure.

FIG. 5 is a flowchart illustrating a process of performing predetermined treatment on the filter channels 31 and 32 using the water-softening system 1 according to an embodiment of the present disclosure.

When a preset condition is satisfied, the processor may perform control such that the treatment device 60 provides the treatment substance to the filter channels 31 and 32 and may perform control such that the filter valves 21 and 22 remain closed during treatment by the treatment substance. Here, the preset condition may be, but is not limited to, whether predetermined time elapses such that the treatment substance is periodically provided, whether the current time reaches predetermined time such that the treatment substance is provided every predetermined time, or whether a user inputs a treatment command using an operation device connected with the processor.

More specifically, when the preset condition is satisfied, so as to form a state for easily providing the treatment material to the filter channels 31 and 32 by the treatment device 60, the processor may perform control such that the filter units 10 stop operating and the filter valves 21 and 22 are closed (S201). Furthermore, the processor may perform control such that the third supply valve 23, which is the raw water valve, remains open while the filter valves 21 and 22 are closed for treatment by the treatment substance. Moreover, the processor may perform control such that the drain valves 40 remain open for a first period of time that is predetermined time and may perform control such that the pump 62 operates while the drain valves 40 remain open for the first period of time. As described above, the treatment substance may be provided from the treatment device 60 to the filter channels 31 and 32 while the drain valves 40 remain open (S202).

The first period of time may be time from when the treatment substance is provided to the filter channels 31 and 32 to when the treatment substance reaches the drain valves 40.

After the filter valves 21 and 22 are closed and then the first period of time elapses, the processor may perform control such that the drain valves 40 are closed and the pump 62 stops operating (S203). Because the raw water valve is open, the consumption site P may receive water through the raw water channel. The state in which the treatment substance is provided to the filter channels 31 and 32, but the filter valves 21 and 22 and the drain valves 40 are all closed (S203) may be referred to as a treatment state.

The processor may perform control such that the drain valves 40 remain closed during the treatment. The treatment may be performed for a second period of time, and the processor may determine whether the second period of time elapses after the start of the treatment (S204). When it is determined that the second period of time does not elapse, the treatment continues to be performed without separate control (S203). While the treatment is performed, water mixed with the treatment substance may stay in the filter channels 31 and 32 and the filter units 10 to perform predetermined treatment on the filter units 10 and the filter channels 31 and 32. When the treatment substance is a citric acid, the filter units 10 and the filter channels 31 and 32 may be cleaned. The second period of time may be 30 minutes, but may be appropriately changed depending on the type of the treatment substance.

When the second period of time elapses after the start of the treatment, the water and the treatment substance used for the treatment have to be discharged. Accordingly, to discharge the treatment substance, the processor performs control such that the drain valves 40 are opened in the closed state of the filter valves 21 and 22 after the second period of time (S205).

To discharge the treatment substance, the processor may allow the water, the treatment substance, and by-products by predetermined treatment of the treatment substance to sufficiently escape, by performing control such that the drain valves 40 are open for a third period of time. The third period of time may be 30 seconds, but may be appropriately selected depending on the capacities of the filter channels 31 and 32 or the capacities of the drain channels 50.

Even after the drain valves 40 for discharging the treatment substance are opened and the water containing the treatment substance is completely discharged through the drain valves 40, the processor may maintain the open state of the drain valves 40 and the closed state of the filter valves 21 and 22 and may perform a rinsing mode in which water additionally flows to rinse the filter units 10 and the filter channels 31 and 32. To perform the rinsing mode, the open state of the drain valves 40 and the closed state of the filter valves 21 and 22 may be maintained. However, the drain valves 40 may be closed and then opened again, and the filter valves 21 and 22 may be opened and then closed again. The processor may perform control such that the filter units 10 additionally perform the regeneration mode in the rinsing mode. This is because due to the treatment substance adsorbed on the filter units 10, it is not appropriate to directly use the filter units 10 without regeneration.

Furthermore, the processor may perform control such that the filter units 10 perform the removal mode in the rinsing mode. In addition, the processor may perform control such that raw water flows through the filter units 10 in the rinsing mode. That is, to rinse and discharge the treatment substance remaining in the filter units 10 and the channels connected thereto, the processor may perform control such that water flows for a predetermined period of time and is discharged, irrespective of how to control the filter units 10.

After the third period of time, the processor may determine whether water is supplied to the consumption site P (S207). When it is determined that no water is supplied to the consumption site P, the processor may perform control such that the drain valves 40 are closed and the filter valves 21 and 22 are opened to form a state in which water is allowed to be supplied to the consumption site P. That is, the processor may perform control such that the drain valves 40 and the filter valves 21 and 22 are in the standby state (S101) described above.

When it is determined that water is supplied to the consumption site P, the processor may perform control such that the drain valves 40 are closed, the filter valves 21 and 22 are opened, and the filter units 10 operate. For example, when it is determined that water is supplied to the consumption site P, the processor may perform control such that the states of the components are changed as in S103. However, the processor may perform control such that the states of the components are changed as in S105.

When the filter valves 21 and 22 are opened after the treatment by the treatment substance is completed, the processor may perform control such that the third supply valve 23, which is the raw water valve, remains closed. This is because soft water is able to be supplied to the consumption site P through the filter channels 31 and 32 so that raw water does not need to be supplied together to the consumption site P through the raw water channel.

Accordingly, the water-softening system may always determine whether water is supplied to a consumption site and may be appropriately controlled to supply water to the consumption site.

Furthermore, predetermined treatment may be performed inside the water-softening system.

In addition, during the treatment, the water-softening system may determine whether water is used in the consumption site.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the teams of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A water-softening system comprising:
    a filter device including filter units provided in at least some of a plurality of supply channels arranged in parallel to supply water to a consumption site, wherein the filter units remove at least part of ionic matter contained in supplied raw water by electro-deionization and discharge soft water containing less ionic matter than the raw water;
    a plurality of supply valves provided in the plurality of supply channels to open or close the supply channels;
    a treatment device configured to provide a treatment substance for predetermined treatment to the supply channels that are provided with a filter unit; and
    a processor connected to the filter device and the plurality of supply valves and the treatment device,
    wherein the plurality of supply channels include a third supply channel which is not provided with a filter unit, to supply raw water to the consumption site,
    wherein the plurality of supply valves include a third supply valve provided in the third supply channel, and
    wherein the processor:
    determines whether water is supplied to the consumption site;
    controls at least one of the plurality of supply valves to remain open to maintain a state in which water is allowed to be supplied to the consumption site, when it is determined that no water is supplied to the consumption site;
    controls the treatment device to provide the treatment substance to the supply channels that are provided with a filter unit; controls the supply valves provided in the supply channels that are provided with a filter unit to remain closed and the third supply valve to remain open during treatment by the treatment substance; and
    controls at least one of the supply valves provided in the supply channels that are provided with a filter unit to be opened and the third supply valve to be closed after the treatment by the treatment substance is completed.

2. The water-softening system of claim 1, wherein the filter units selectively perform any one of a removal mode of removing the ionic matter by electro-deionization through electrodes and a regeneration mode of regenerating the electrodes.

3. The water-softening system of claim 2, wherein the filter device includes at least two filter units provided in at least two supply channels among the plurality of supply channels,
    wherein any one of the at least two filter units is a first filter unit, another one is a second filter unit, a supply valve installed in a supply channel provided with the first filter unit is a first supply valve, and a supply valve installed in a supply channel provided with the second filter unit is a second supply valve, and
    wherein the processor performs control such that the first supply valve remains open, when it is determined that no water is supplied to the consumption site.

4. The water-softening system of claim 3, wherein the processor performs control such that the first filter unit performs the removal mode in an open state of the first supply valve, when water starts to be supplied to the consumption site through the supply channel provided with the first supply valve in the open state of the first supply valve.

5. The water-softening system of claim 4, wherein the processor determines again whether water is supplied to the consumption site, when mode transition time elapses after the first filter unit performs the removal mode, and
wherein when it is determined that water is supplied to the consumption site, the processor:
controls the first filter unit to perform the regeneration mode;
controls the second filter unit to perform the removal mode;
controls the first supply valve to be closed; and
controls the second supply valve to be opened.

6. The water-softening system of claim 3, wherein the first supply valve is a solenoid valve configured to maintain an open state and configured to be closed only when receiving an electrical signal.

7. The water-softening system of claim 6, wherein the remaining supply valves other than the first supply valve are solenoid valves configured to maintain a closed state and configured to be opened only when receiving an electrical signal.

8. The water-softening system of claim 2, wherein the filter device includes at least two filter units provided in at least two supply channels among the plurality of supply channels,
wherein any one of the at least two filter units is a first filter unit, another one is a second filter unit, a supply valve installed in a supply channel provided with the first filter unit is a first supply valve, and a supply valve installed in a supply channel provided with the second filter unit is a second supply valve, and
wherein when water starts to be supplied to the consumption site through the supply channel provided with the supply valve that is in the open state, the processor:
controls any one of the first and second filter units to perform the removal mode;
controls the other filter unit to perform the regeneration mode;
performs control to open the first or second supply valve installed in a supply channel provided with a filter unit configured to perform the removal mode; and
performs control to close the first or second supply valve installed in a supply channel provided with a filter unit configured to perform the regeneration mode.

9. The water-softening system of claim 8, wherein the processor determines again whether water is supplied to the consumption site, every time mode transition time elapses after water starts to be supplied to the consumption site, and
wherein when it is determined that water is supplied to the consumption site, the processor:
controls the first filter unit to perform the removal mode or the regeneration mode that is not currently performed by the first filter unit;
controls the second filter unit to perform the removal mode or the regeneration mode that is not currently performed by the second filter unit;
performs control to open the first or second supply valve installed in a supply channel provided with a filter unit configured to perform the removal mode; and
performs control to close the first or second supply valve installed in a supply channel provided with a filter unit configured to perform the regeneration mode.

10. The water-softening system of claim 8, wherein the processor determines again whether water is supplied to the consumption site, every time mode transition time elapses after water starts to be supplied to the consumption site, and
wherein when it is determined that no water is supplied to the consumption site, the processor:
performs control such that the first or second filter unit configured to perform the removal mode performs the regeneration mode;
performs control such that the first or second filter unit configured to perform the regeneration mode stops operating;
performs control to open the first or second supply valve installed in a supply channel provided with a filter unit configured to stop operating; and
performs control to close the first or second supply valve installed in a supply channel provided with a filter unit configured to perform the regeneration mode.

11. The water-softening system of claim 10, wherein the processor determines again whether water is supplied to the consumption site within confirmation time, after it is determined that water supply to the consumption site is stopped, and
wherein when it is determined that no water is supplied to the consumption site, the processor:
controls the first and second filter units to stop operating;
performs control to open any one predetermined supply valve of the first and second supply valves; and
performs controls to close the other supply valve.

12. The water-softening system of claim 10, wherein the processor determines again whether water is supplied to the consumption site within confirmation time, after it is determined that water supply to the consumption site is stopped, and
wherein when it is determined that water is supplied to the consumption site, the processor performs control such that the first or second filter unit configured to stop operating performs the removal mode in a state in which open/closed states of the first and second supply valves are maintained.

13. The water-softening system of claim 2, further comprising:
drain channels connected to the supply channels provided with the filter units to drain, to the outside, water released from the filter units in the regeneration mode; and
drain valves provided in the drain channels to open or close the drain channels.

14. The water-softening system of claim 13, wherein the processor is additionally connected to the drain valves, and
wherein the processor performs control such that the drain valves are changed to opposite states to open/closed states of the corresponding supply valves in conjunction with the open/closed states of the corresponding supply valves.

15. The water-softening system of claim 1, further comprising:
a flow-rate acquisition device configured to obtain a flow rate of water delivered to the consumption site,
wherein the processor is additionally connected with the flow-rate acquisition device, and
wherein the processor determines that water is supplied to the consumption site, when the flow rate obtained by the flow-rate acquisition device is higher than or equal to a critical flow rate.

16. The water-softening system of claim 1, wherein the processor determines whether water is supplied to the consumption site, and
wherein the processor performs control such that at least one of the plurality of supply valves remain open to maintain a state in which water is allowed to be supplied to the consumption site, when it is determined that no water is supplied to the consumption site.

17. The water-softening system of claim 16, wherein when water starts to be supplied to the consumption site through the supply channel provided with a first supply valve or a second supply valve in an open state of the first supply valve and the second supply valve, the processor performs control such that in the open state of the first supply valve, the first filter unit performs a removal mode and the second supply valve is closed.

18. A water-softening system comprising:
   filter units provided in supply channels configured to supply water to a consumption site, wherein the filter units remove at least part of ionic matter contained in supplied raw water by electric force and discharge soft water containing less ionic matter than the raw water;
   filter valves provided in filter channels provided with the filter units among the supply channels;
   a treatment device configured to provide a treatment substance for predetermined treatment to the filter channels; and
   a processor connected to the filter units, the filter valves, and the treatment device, wherein the water-softening system further comprises a third supply channel which is not provided with a filter unit, to supply raw water to the consumption site and a third supply valve provided in the third supply channel and connected to the processor, and wherein the processor:

controls the treatment device to provide the treatment substance to the filter channels, when a preset condition is satisfied;

controls the filter valves to remain closed and the third supply valve to remain open during treatment by the treatment substance, and controls at least one of the filter valves to be opened and the third supply valve to be closed after the treatment by the treatment substance is completed.

\* \* \* \* \*